(12) United States Patent
Poshusta et al.

(10) Patent No.: US 8,197,976 B2
(45) Date of Patent: Jun. 12, 2012

(54) SOLID OXIDE FUEL CELL SYSTEMS WITH HOT ZONES AND TWO-STAGE TAIL GAS COMBUSTORS

(75) Inventors: Joseph C. Poshusta, Broomfield, CO (US); Ames Kulprathipanja, Broomfield, CO (US); Christine M. Martin, Superior, CO (US); Jerry L. Martin, Superior, CO (US)

(73) Assignee: Protonex Technology Corporation, Southborough, MA (US)

( * ) Notice: Subject to any disclaimer, the term of this patent is extended or adjusted under 35 U.S.C. 154(b) by 294 days.

(21) Appl. No.: 12/006,688

(22) Filed: Jan. 4, 2008

(65) Prior Publication Data
US 2009/0176136 A1  Jul. 9, 2009

(51) Int. Cl.
*H01M 8/04* (2006.01)
(52) U.S. Cl. ......... 429/440; 429/408; 429/441; 429/497
(58) Field of Classification Search .................. 429/408, 429/440, 441, 497
See application file for complete search history.

(56) References Cited

U.S. PATENT DOCUMENTS

| | | | |
|---|---|---|---|
| 4,910,100 A | | 3/1990 | Nakanishi et al. |
| 5,169,730 A | * | 12/1992 | Reichner et al. .......... 429/20 |
| 5,733,675 A | * | 3/1998 | Dederer et al. .......... 429/19 |
| 5,750,278 A | * | 5/1998 | Gillett et al. .......... 429/436 |
| 2003/0054215 A1 | * | 3/2003 | Doshi et al. .......... 429/26 |
| 2006/0263655 A1 | * | 11/2006 | Schaevitz et al. .......... 429/13 |
| 2007/0148523 A1 | * | 6/2007 | Brown et al. .......... 429/34 |
| 2007/0196704 A1 | * | 8/2007 | Valensa et al. .......... 429/20 |

OTHER PUBLICATIONS

International Search Report for Related International Application No. PCT/US2009/000004 (2 pages), (Feb. 25, 2009).
The Written Opinion for International Application No. PCT/US2009/000004 (7 pages), (Feb. 25, 2009).

* cited by examiner

*Primary Examiner* — Barbara Gilliam
*Assistant Examiner* — Zachary Best
(74) *Attorney, Agent, or Firm* — Edwards Wildman Palmer LLP; Christine C. O'Day; George N. Chaclas

(57) ABSTRACT

A solid oxide fuel cell system including a main plate, an inner cylinder attached to the main plate, an intermediate cylinder attached to the main plate such that the intermediate cylinder contains a cathode air stream, and an outer cylinder attached to the main plate. An exhaust annular gap is formed between the intermediate and outer cylinders such that hot exhaust gases flow through the exhaust annular gap and heat is transferred from the hot exhaust gases to the cathode air stream. The solid oxide fuel cell system may also include a two-stage tail gas combustor.

23 Claims, 6 Drawing Sheets

SOLID OXIDE FUEL CELL SYSTEMS WITH HOT ZONES AND TWO-STAGE TAIL GAS COMBUSTORS

BACKGROUND OF THE INVENTION

1. Field of the Invention

The subject disclosure relates to fuel cells, and more particularly to solid oxide fuel cell systems having improved hot zones and tail gas combustors.

2. Background of the Related Art

Referring to FIG. 1, a schematic view of a general solid oxide fuel cell (SOFC) 110 with a hot zone 112 is shown. The SOFC 110 has an electrochemical stack 120 typically operating at temperatures above 700° C. Several other support components are also operating at elevated temperature. The area of integration of the elevated temperature components is referred to as the hot zone 112. The hot zone 112 is insulated to reduce heat loss and maintain the desired operating temperature.

The components of the hot zone 112 include a catalytic partial oxidation (CPOX) reactor 114 for converting the system feed hydrocarbon fuel to a hydrogen and carbon monoxide rich feed for the stack 120 of the SOFC 110. A tail gas combustor 116 burns the remaining unutilized fuel from the stack 112 to reduce CO emissions and also to aid in other endothermic reactions. A recuperator heat exchanger 118 decreases the SOFC exhaust temperature by cooling the exhaust gas with the inlet stack air. By heating the inlet stack air and using a vaporizer 122, the feed hydrocarbon fuel is readied for the CPOX reactor 114.

A power conditioning unit 124 also connects to the electrochemical stack 120. A blower 126 provides air to the CPOX reactor 114. A fuel tank 128 and fuel pump 130 provide fuel to the vaporizer 122. A cathode blower 132 provides air to the recuperator 118.

The approach of FIG. 1 has several disadvantages. Each component requires piping to connect to the neighboring component. This plumbing requires a high temperature sealing method such as brazing or welding, a very labor intensive and extremely difficult to automate process. Each hot zone component also requires special features for braze or weld joints to the attached piping. These special features are typically machined, and result in high cost components.

Further, some stack components are ceramic, and sealing metal-to-ceramic joints is difficult such as shown in U.S. Patent Application Publication No. 2004/0195782 published on Oct. 7, 2004. The hot CPOX reactor 114 and tail gas combustor 116 are located away from the electrochemical stack 120, which slows heating at startup. Assembling and joining these components in close proximity is difficult and requires packing a large volume in a small space. Consequently, the support components can undesirably occupy as much hot zone volume as the electrochemical stack 120. The inability to closely integrate the hot zone components leads to a low hot zone power density.

For indoor applications, high fuel utilization is particularly desirable for efficiency and proper emissions. The SOFC 110 cannot alone utilize the fuel unless the SOFC 110 is impracticably large. Thus, the performance of the tail gas combustor 116 is particularly important and serves as a source of thermal energy that can be used for other needs. For instance, the thermal energy can keep the stack 120 at operating temperature and balance heat losses through insulation and system exhaust.

The tail gas combustor 116 is typically catalytic or homogeneous in nature. Catalytic combustors have the advantage of being able to operate over a wider temperature and concentration range than homogeneous flame combustors. A SOFC stack 112 operated at about 75% utilization that is fed products from the CPOX reactor 114 will output a tail gas that might experience a 300 degree temperature rise in an adiabatic tail gas combustor. For a stack 112 operating at 800° C., this would result in a tail gas combustor temperature of approximately 1100° C. Real tail gas combustors operate non-adiabatically, and measured temperatures for a tail gas combustor are typically at least 900° C. In view of the above, the tail gas combustor 116 is made to perform optimally under high temperatures. However, at the low temperatures of start up, these tail gas combustors 116 perform poorly and emissions suffer.

Additionally, the tail gas combustor 116 may be poorly suited to temperature extremes and even breakdown during exposure. For example, one catalyst used for the tail gas combustor 116 is a conventional noble metal catalyst such as platinum. The high activity of the platinum ensures quick light-off in a cold system and enables a very compact tail gas combustor 116. But, one significant disadvantage of noble metal combustion catalysts is their low stability in high temperature environments. Metal loss due to evaporation eventually leads to decreased activity and poor combustor performance. While sustained operation at 1100° C. is atypical, higher temperatures can lead to rapid catalyst evaporation and metal depletion in minutes. These conditions can occur easily in off-design conditions, such as when a SOFC operating at steady state suddenly experiences an open circuit condition by the user disconnecting the system load. A sudden open circuit condition, where no current is drawn by the SOFC stack 120, will reduce utilization to zero. Thus, all of the fuel and cathode air will be combusted in the tail gas combustor 116. These gases can experience over a 1000° C. adiabatic temperature rise, which when entering the tail gas combustor 116 at 800° C. can result in an elevated tail gas combustor temperature as high as 1800° C. This temperature is certainly high enough to destroy a noble metal catalyst quickly.

Some steps can be taken to minimize the temperature effects of off-design conditions on the tail gas combustor 116. For instance, a protection circuit can be used to continue to draw current from the stack 120 if the system load is disconnected. A more robust tail gas combustor would help alleviate such concerns. One option is a metal oxide combustion catalyst that is more stable than the noble metal materials. Perovskite catalysts are one example. While such materials are more stable and able to operate in very high temperature environments for longer periods, their activity is much lower than noble metals. Hence, performance suffers. Indeed, even when ignited, a low activity combustion catalyst has difficulty completely burning all of the carbon monoxide in the system exhaust.

SUMMARY OF INVENTION

It is an object of the subject technology to improve hot zone integration of components in a simple and low-cost design. The current invention overcomes the problems of earlier hot zone integration by using multifunctional components as part of an overall assembly that achieves the necessary functions without having separate components for each function.

It is another object of the subject technology to reduce the number of individual components, reduce the cost of each component, and reduce the assembly labor and complexity for the SOFC system.

The subject technology relates to the integration and manufacture of hot zone components in a SOFC system. In particular, the subject technology simplifies the construction and manufacture of the design over previous methods. Expensive machining steps are minimized, and the design is developed with volume manufacturing methods in mind.

Further, the subject technology creates a reducing environment in which the tubular cells of the stack can be connected. Thus, the interconnects for the tubular cells can be easily assembled and manufactured from a highly conductive but easily oxidized material such as copper. In one embodiment, each interconnect has a body with an anode contact and a cathode contact extending therefrom. The anode contact is pre-formed to follow a contour of an anode portion of the tubular cells and the cathode contact is pre-formed to follow a contour of a cathode portion of the tubular cells. A contact aid may be applied to the anode contact and/or cathode contact for securing the contact to the respective portion of the tubular cells.

It is another object of the subject technology to add a second stage to the tail gas combustor, the two stages being adapted and configured to improve fuel utilization. The first stage is more robust while the second stage improves performance, particularly at low temperatures. Also, the two stages are effectively integrated into the overall design so that assembly is efficient. As a result, the two-stage tail gas combustor is durable, works across a wide temperature range, cost-effective to manufacture, and burns with a high degree of fuel conversion.

In one embodiment, the subject technology is directed to a solid oxide fuel cell system including a stack, a feed tube extending through the stack for providing an anode feed stream, and an end cap 221 sealed to the stack to form an anode feed plenum having a reducing environment. The anode feed plenum is in fluid communication with the feed tube so that the anode feed stream passes through the stack to become an anode exhaust. A main plate supports the stack and forms an exhaust plenum into which the anode exhaust flows. The main plate also defines a feed hole. An inner cylinder attaches to the main plate and encloses the stack and end cap to form a cathode feed plenum so that a cathode gas stream mixes with the anode exhaust in the exhaust plenum to form an exhaust flow. A hot zone boundary element couples to the main plate. The hot zone boundary element has a cap defining a flame space with the main plate. A tail gas combustor is located in the flame space so that the exhaust flow enters the tail gas combustor by the feed hole and becomes a heated exhaust stream. An outer cylinder couples to the cap and encloses the inner cylinder to define an exhaust annular gap around the inner cylinder. The heated exhaust stream exits through the exhaust annular gap and, in turn, exchanges heat with the cathode feed plenum. Further, the feed tube can extend centrally through the stack. A CPOX reactor is in the feed tube to provide fuel flow into the anode feed plenum. The tail gas combustor may have a first stage in the flame space and a second stage in the exhaust annular gap.

In another embodiment, the subject technology is directed to a solid oxide fuel cell system including a main plate and a stack depending from the main plate. The stack has anodes and cathodes, wherein the main plate defines an exhaust plenum with the stack. A feed tube is supported by the main plate and extends into the stack. An end cap couples to the stack for defining an anode air stream plenum in fluid communication with the anodes. An inner cylinder is supported by and sealingly attached to the main plate such that the inner cylinder partially surrounds the stack to define a cathode air stream plenum in fluid communication with the cathodes. The exhaust plenum is in fluid communication with the anode air stream plenum and cathode air stream plenum. The inner cylinder may include a step adjacent the main plate to define a portion of the cathode air stream plenum and the main plate may be planar and substantially circular.

In still another embodiment, the subject technology is directed to a solid oxide fuel cell system including a stack, a main plate secured to the stack and forming an exhaust plenum therewith, the main plate also defining a feed hole. An inner cylinder couples to the main plate and encloses the stack to direct a cathode exhaust flow into the exhaust plenum. A hot zone boundary element connects to the main plate and has a cap defining a flame space with the main plate. A first stage of a tail gas combustor is located in the flame space, wherein the exhaust flow enters the flame space by the main plate feed hole and, in turn, passes through the first stage to become a first stage exhaust stream. An outer cylinder couples to the cap and encloses the inner cylinder to define an exhaust gap around the inner cylinder, wherein the exhaust gap is in fluid communication with the flame space so that the first stage exhaust stream cools therein. A second stage of the tail gas combustor is located in the exhaust gap, wherein the cooled first stage exhaust stream passes through the second stage before exiting.

The subject technology also includes a solid oxide fuel cell system having an improved hot zone with a stack fixed between an inlet end tube sheet and an outlet end tube sheet. An end cap seals to the inlet end tube sheet to form an anode feed plenum. A main plate couples to the outlet end tube sheet to form an exhaust plenum. A feed tube is supported by the main plate and extends centrally through the inlet end tube sheet and outlet end tube sheet. The feed tube has a CPOX reactor configured so that flow from the CPOX reactor is directed into the stack via the anode feed plenum and heat from the CPOX reactor radiates to the stack. A partial cylinder depends from the main plate around a portion of the stack. An intermediate cylinder has a closed end and an open end, the open end being attached to the main plate such that the intermediate cylinder defines an annular feed gap around the partial cylinder for containing a cathode air stream. An insulation cap couples to the main plate for forming a flame space in communication with the exhaust plenum. An outer cylinder has a closed end and an open end. The open end of the outer cylinder is coupled to the main plate such that the outer cylinder defines an exhaust annular gap around the intermediate cylinder for containing hot exhaust gases exiting the flame space, wherein heat is transferred from the hot exhaust gases to the cathode air stream.

In yet another embodiment, the subject technology is a solid oxide fuel cell system including a stack having an anode feed plenum for receiving an anode feed stream and a main plate supporting the stack and defining an exhaust plenum. An inner cylinder has a closed end and an open end, the open end being attached to the main plate such that the inner cylinder defines a cathode feed plenum for containing a cathode air stream. An outer cylinder has a closed end and an open end, the open end being attached to the main plate such that the outer cylinder defines an exhaust annular gap around the inner cylinder. The exhaust annular gap is in fluid communication with the exhaust plenum, wherein a heat exchanger is formed between the inner and outer cylinders. Means is in fluid communication with the stack for mixing the cathode air stream and anode air stream to create an exhaust gas, and directing the exhaust gas into the exhaust annular gap. The means may include holes defined in the main plate, an inlet end tube sheet disposed in the inner cylinder, and an outlet end tube sheet disposed in the inner cylinder, wherein the stack is fixed between the inlet end tube sheet and the outlet end tube sheet.

It should be appreciated that the present invention can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art will more readily understand how to make and use the same, reference may be had to the following drawings.

DETAILED DESCRIPTION OF PREFERRED EMBODIMENTS

The present invention overcomes many of the prior art problems associated with hot zone integration in fuel cell systems and the short comings of single stage tail gas combustors. The advantages, and other features of the systems and methods disclosed herein, will become more readily apparent to those having ordinary skill in the art from the following detailed description of certain preferred embodiments taken in conjunction with the drawings which set forth representative embodiments. All relative descriptions herein such as inner, outer, upward, downward, top, bottom, left, right, up, and down are with reference to the Figures, and not meant in a limiting sense.

Figure 1:
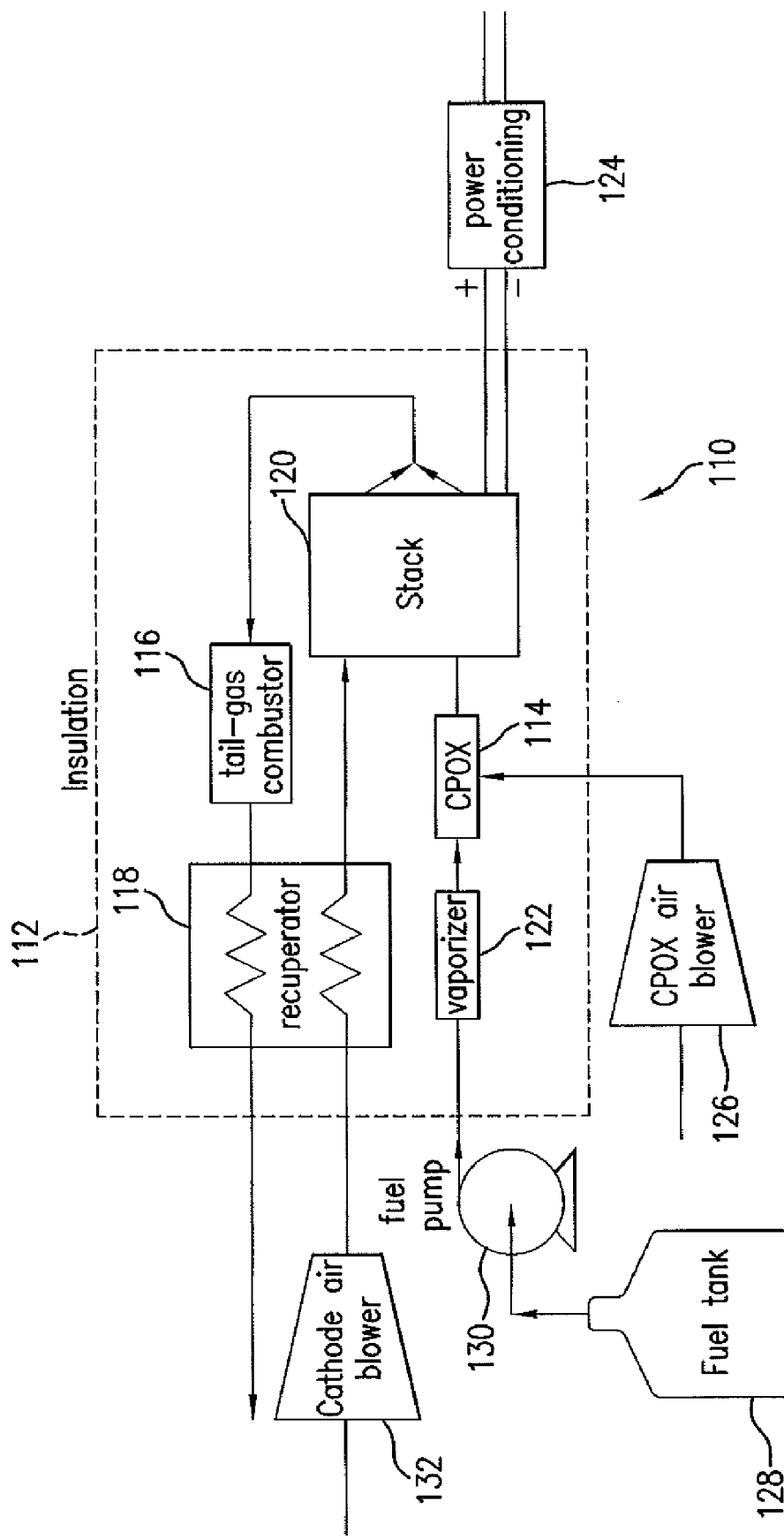
FIG. 1 is a schematic view of a standard solid oxide fuel cell (SOFC) system with a hot zone.
Figure 2:
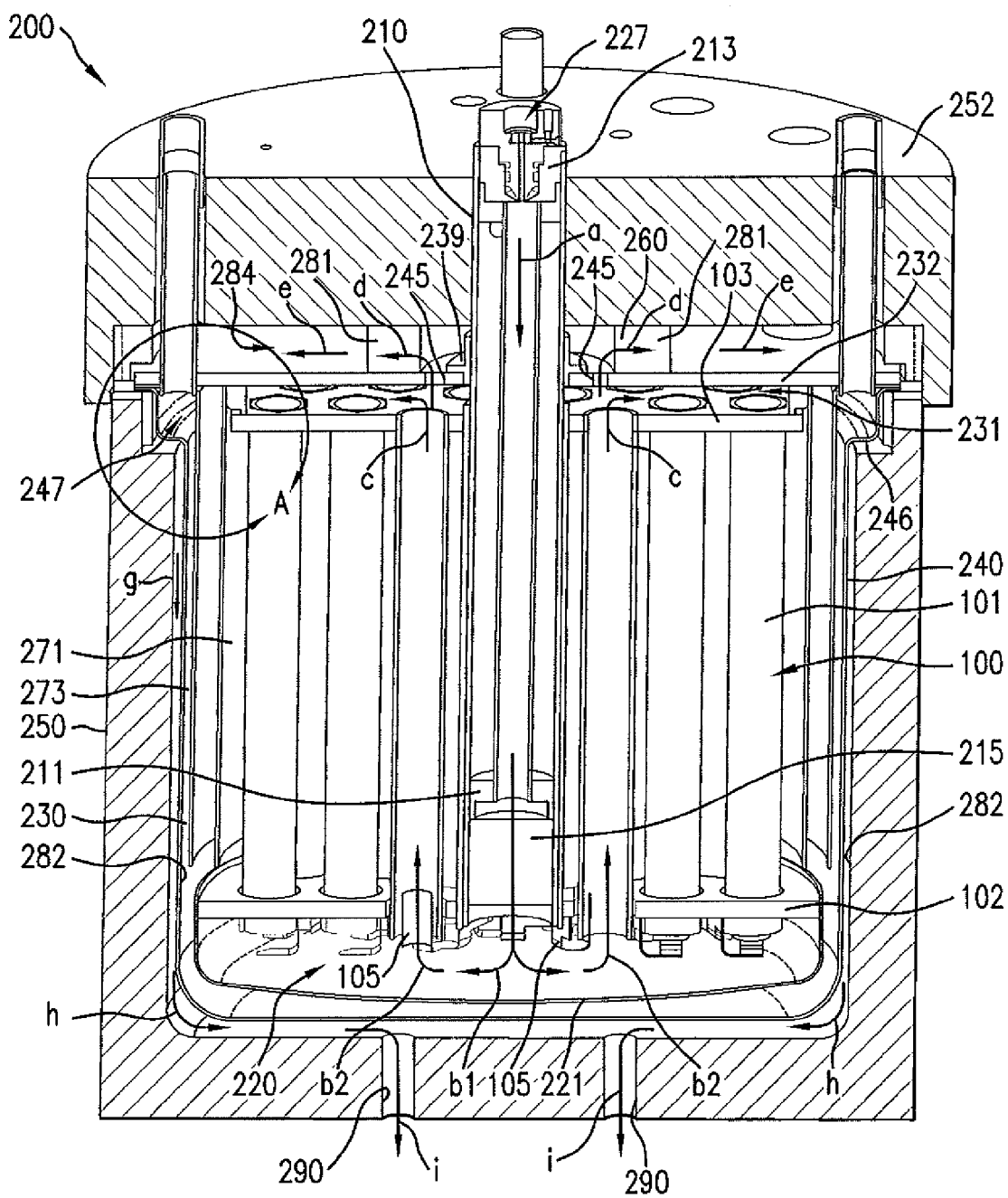
FIG. 2 is a cross-sectional view of a SOFC system with an improved hot zone and tail gas combustor using multifunctional components constructed in accordance with the subject technology.
Figure 2A:
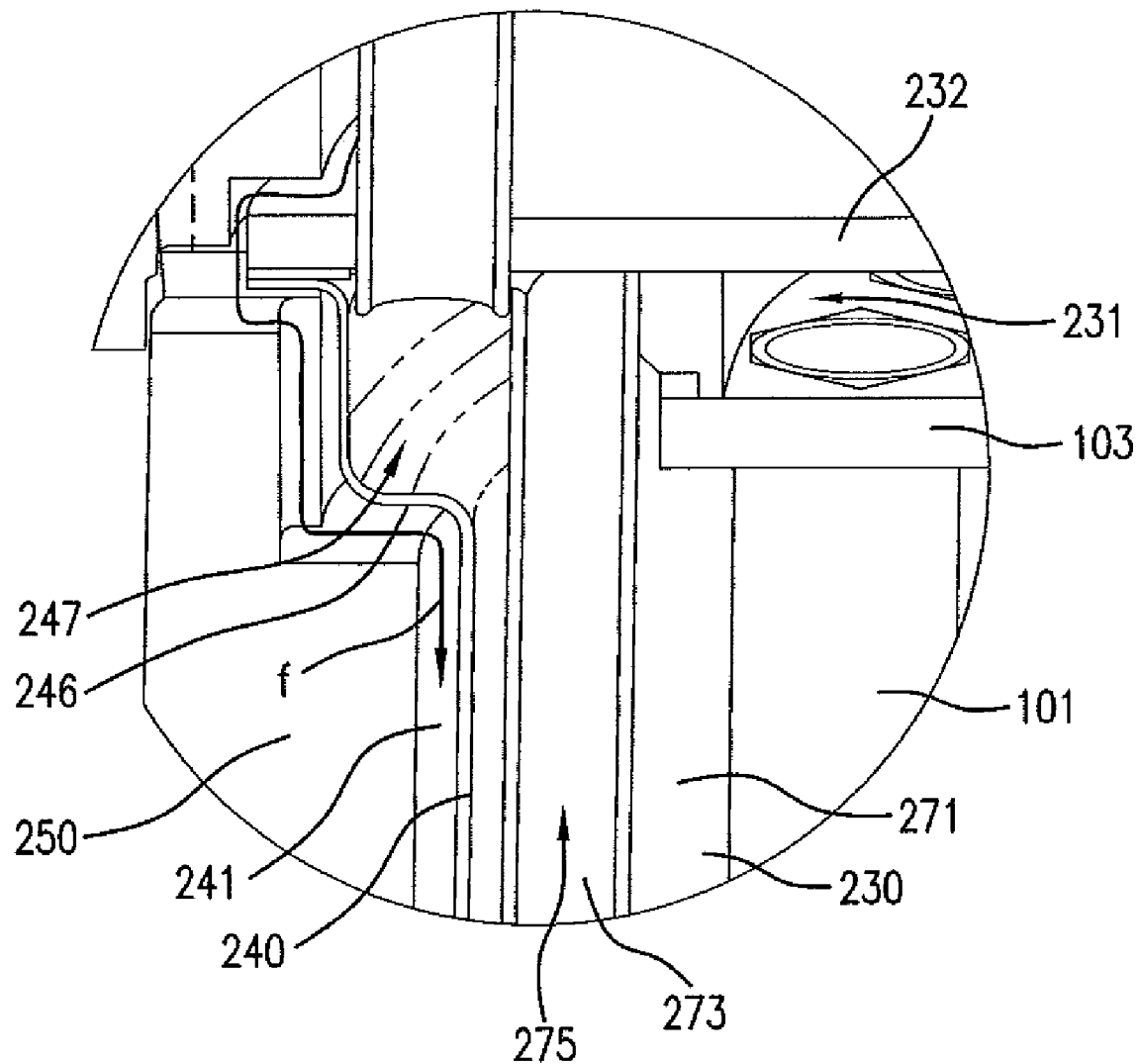
FIG. 2A is a detailed view of the portion of FIG. 2 in circle A.
Figure 3:
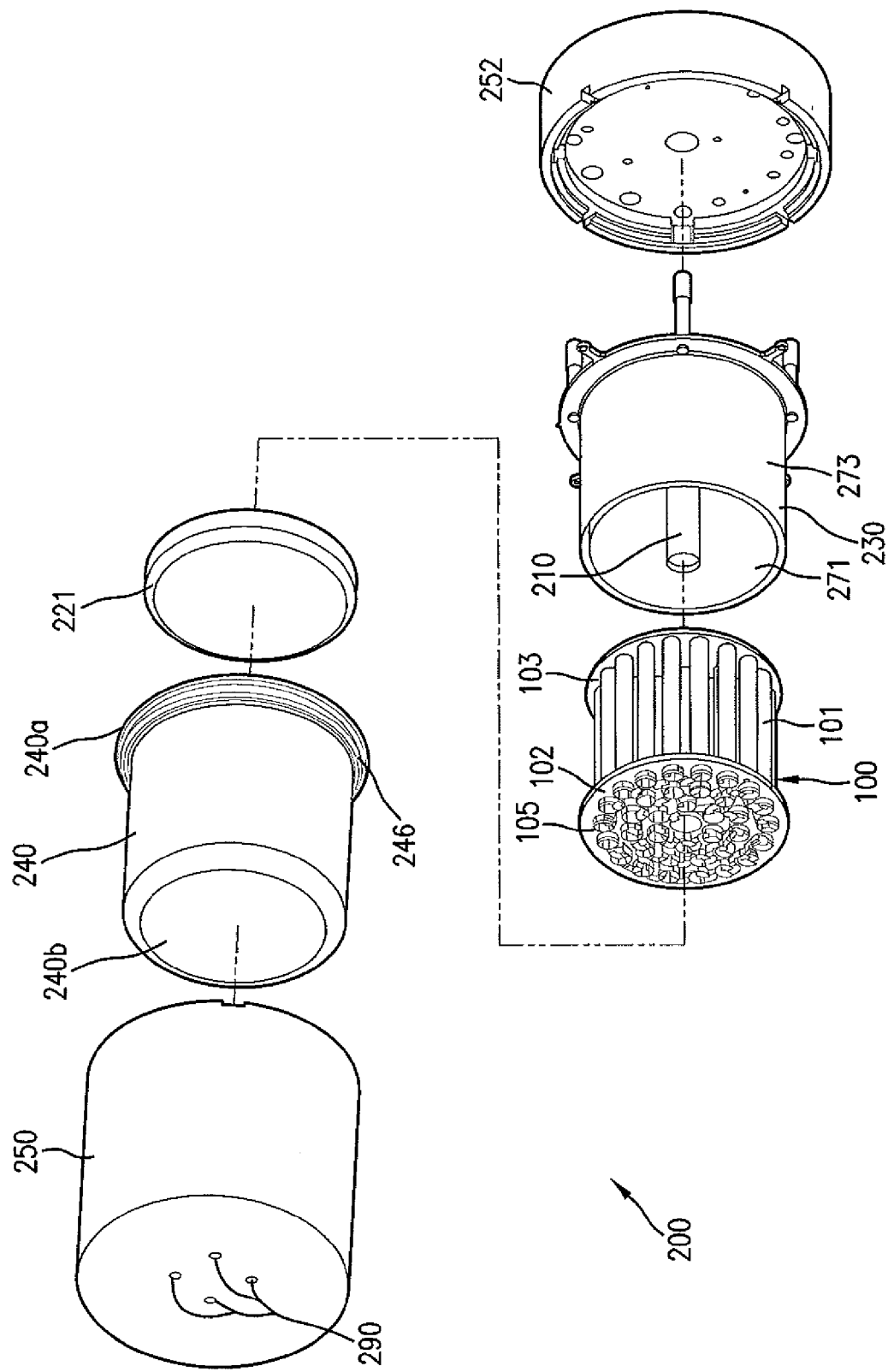
FIG. 3 is an exploded perspective view of the SOFC system of FIG. 2.

Referring now to FIGS. 2, 2A and 3, various views of a SOFC system 200 constructed in accordance with the subject technology are shown. The SOFC system 200 includes an elongated stack 100 that consists of a bundle of tubular cells 101 held in relation to each other by an inlet end tube sheet 102 and an exhaust or outlet end tube sheet 103. The tubular cells 101 are connected by interconnects 105 in accordance with the technology disclosed in co-pending, co-owned U.S. patent application Ser. No. 11/895,333, filed Aug. 24, 2007, entitled Electrical Interconnects for a Solid Oxide Fuel Cell Stack.

An anode feed plenum 220 is formed by a stack end cap 221 sealed to the inlet end tube sheet 102. The SOFC system 200 creates a reducing environment inside the anode feed plenum 220, thus, oxidation-resistant materials are not required to fabricate the interconnects 105. Thus, the interconnects 105 can be easily assembled and manufactured from a highly conductive but easily oxidized material such as copper. In one embodiment, each interconnect 105 has a body with an anode contact and a cathode contact extending therefrom. The anode contact is pre-formed to follow a contour of an anode portion of the tubular cells and the cathode contact is pre-formed to follow a contour of a cathode portion of the tubular cells. A contact aid may be applied to the anode contact and/or cathode contact for securing the contact to the respective portion of the tubular cells 101.

Still referring to FIGS. 2, 2A and 3, FIG. 2 includes arrows to indicate flow through the SOFC system 200. Liquid fuel enters the SOFC system 200 by an inlet 227 so that an atomizer 213 creates a fuel/air stream from the liquid fuel. The fuel/air stream passes down a feed tube 210 as indicated by arrow "a" to a CPOX reactor 211. In another embodiment, the CPOX reactor 211 has a gas feed provided by other means known to those of skill in the art. The feed tube 210 is near a radial center of the bundle of stacks 101 and the CPOX reactor 211 is integral therewith. The CPOX reactor 211 converts the fuel/air stream into a hydrogen and carbon monoxide rich product stream or reformate that passes into the anode feed plenum 220 as indicated by arrow "b1". The CPOX reactor 211 has a porous catalyst material 215 to create the conversion.

The CPOX reactor 211 may be outside the stack 100, well within the stack 100 (e.g., near an axial center), near the upper end or near the lower end as shown. Although not required, by being centered, heat from the CPOX reactor 211 is generated within the stack 100, thus delivering heat efficiently to the stack 100 during a cold start. The anode feed plenum 220 causes flow from the CPOX reactor 211 to be redirected into the SOFC tubes 101 along flow arrows "b2". As would be appreciated, the SOFC system 200 has the cell anode located at the inside surface of the tubular cells 101 but the subject technology is not limited to such a configuration.

The elongated bundle 101 is adjacent the stack end cap 221, which forms the anode feed plenum 220. The stack end cap 221 is cup-shaped and has an upper open end that seals against the outlet end tube sheet 103 to form the anode feed plenum 220. When assembled, the stack end cap 221 is inside two concentric shells or cylinders 240, 250. The configuration and relationship between the stack end cap 221, outlet end tube sheet 103, a main plate 232 and the intermediate cylinder 240 forms an exhaust end plenum 231, which may be sealed with the aid of a seal gasket, support ring or the like. As can be seen, the outer cylinder 250 connects to an insulation cap 252 to form an outer insulation boundary, e.g., contain the hot zone. The insulation cap 252 also serves as a fluid boundary about the liquid fuel atomizer 213.

The exhaust end plenum 231 is largely between the outlet end tube sheet 103 and the main plate 232. The anode exhaust passes into the exhaust end plenum 231 as indicated by arrows "c". The outlet end tube sheet 103 is perforated or loosely fits the SOFC tube bundle 101 to allow cathode air to pass through the outlet end tube sheet 103 and into the exhaust end plenum 231. Also, a step 246 in the diameter of the intermediate cylinder 240 forms a cathode feed plenum 247 near the main plate 232 in fluid communication with the cathode air stream. In part, the cathode air feed stream enters the cathode feed plenum 247 between the stack end cap 221 and intermediate cylinder 240. From the cathode feed plenum 247, the cathode air feed stream also passes into the exhaust end plenum 231. The cathode feed plenum 247 helps to distribute the flow evenly. As a result, cathode and anode exhaust gases are well mixed in the exhaust end plenum 231 to form the SOFC exhaust.

The SOFC system 200 also includes an open-ended two-layer shell 230 to allow for wiring connections without compromising the flow in the stack 100. Inner and outer tubular portions 271, 273 depend from the main plate 232. The outer tubular portion 273 nestles closely within the intermediate cylinder 240 and, as a result, a heat exchanger with high heat transfer is formed there between. A service space 275 is created between the inner and outer tubular portions 271, 273 so that electrical wires (not shown) for power, sensors and the like can reach the bottom of the SOFC system 200 without interrupting gas flow. The main plate 232 has a mounting flange 239 in a top end 237 for retaining the feed tube 210 centrally within the two-layer shell 230.

Still referring to FIGS. 2, 2A and 3, the SOFC exhaust in the exhaust end plenum 231 passes through feed or exit holes 245 in the main plate 232 into a flame space 284 as shown by flow arrows "d". The flame space 284 is below the insulation cap 252 so that flame combustion can be exploited for startup. The SOFC system 200 may have all or part of a tail gas combustor 260 located in the flame space 284.

Figure 4:
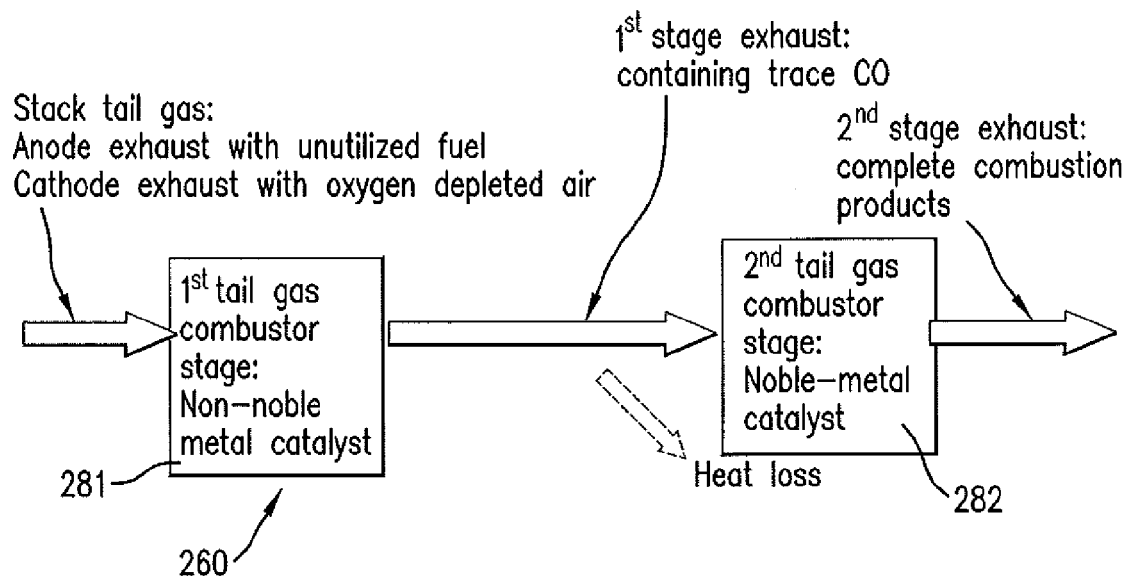
FIG. 4 is a schematic representation of a two-stage catalytic tail gas combustor in accordance with the subject technology.

Preferably, the SOFC system 200 has a two-stage catalytic tail gas combustor 260 as shown in FIG. 4. FIG. 4 illustrates a schematic representation of a two-stage catalytic tail gas combustor 260. The two-stage tail gas combustor 260 solves the problem of poor performance for non-noble metal tail gas combustor catalysts by having first and second tail gas combustor stages 281, 282. The first combustor stage 281 contains a high temperature metal oxide combustion catalyst whereas the second combustor stage 282 contains a highly active combustion catalyst such as a noble metal. By positioning the second combustor stage 282 down stream of the first combustor stage 281, the combustion products from the first combustor stage 281 cool before entering the second combustor stage 282. Thus, the second combustor stage 282 combusts the remaining carbon monoxide from the first stage product under a reduced or normal operating condition without being exposed to excessively high temperatures even if operation was not normal such as during an off-design event. As a result, the two-stage tail gas combustor 260 is more efficient across a wide temperature range and more durable.

Figure 5:
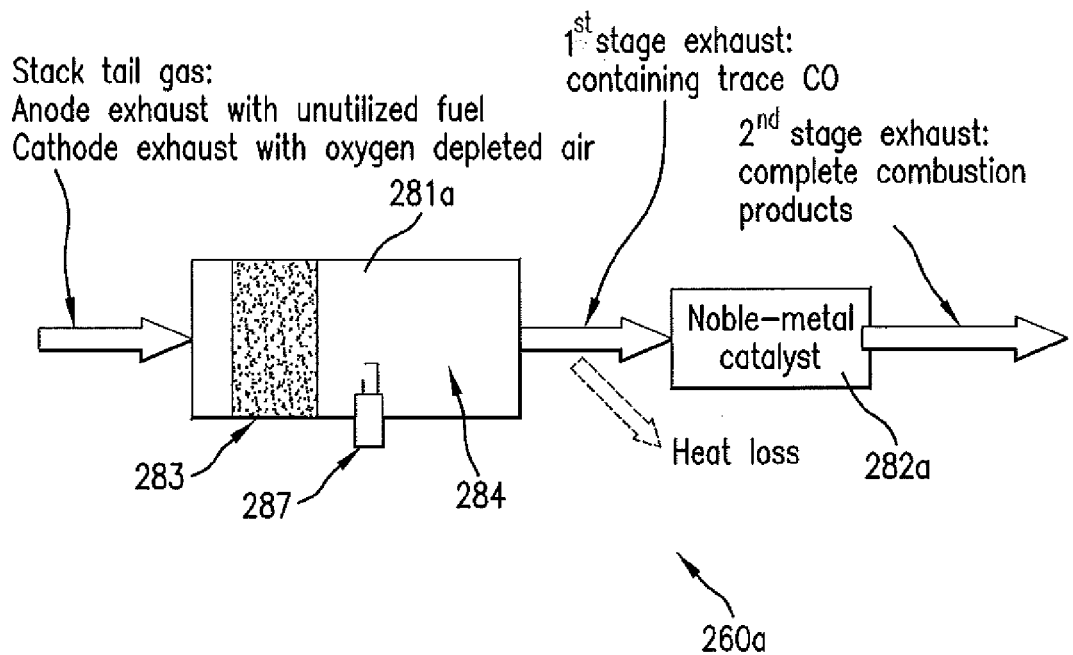
FIG. 5 is a schematic representation of another two-stage catalytic tail gas combustor in accordance with the subject technology.

Referring now to FIG. 5, another embodiment of a two-stage tail gas combustor 260a is shown schematically and referred to generally with similar reference numerals as that of FIG. 5 but followed by the letter "a". The two-stage tail gas combustor 260a includes a homogeneous flame combustor in the first-stage tail gas combustor 281a. A preferred catalyst 283 in the first combustor stage 281a is a non-noble metal catalyst on porous support such as a Perovskite based combustion catalyst supported on a porous refractory support material such as alumina. Suitable supports include reticulated alumina foam and extruded cordierite honeycomb monolith. The catalyst/support structure also serves as a flame holder. Sufficient spacing in the flame space 284 after the catalyst 283 is provided to allow homogeneous combustion without quenching on the surrounding structure. The second stage 282a may be wash-coated or otherwise affixed in place.

A spark igniter 287 enables quick and simple flame ignition so that during a cold start of the SOFC system 200, the tail gas combustor 260 is easily ignited when the fuel and air mixture is within the flammability limits. The heat produced by the flame in the first combustor stage 281a helps raise the temperature in the hot zone as well as the catalyst material 283 in the first combustor stage 281a. As the catalyst in the first combustor stage 281a reaches the ignition temperature of the catalyst and feed mixture, catalytic combustion begins and extinguishes the flame. As temperature continues to rise, the combustor feed composition can be adjusted outside the flammability limits by increasing stack utilization, adjusting cathode air flow, or adjusting the fuel processor operating condition as required to maintain the desired operating temperature or to maximize system performance. Preferably, the first stage 281a is located within or near the stack 100 and around or near the feed tube 210 to provide heat thereto.

Referring back to FIGS. 2, 2A and 3, the exhaust passes through the first stage 281 of the two-stage tail gas combustor 260 into another part of the flame space 284 as indicated by arrow "e". To exit the flame space 284, the exhaust gas enters a tail gas combustor (TGC) annulus 241 as indicated by arrow "f" in FIG. 2A. To form the TGC annulus 241, the intermediate cylinder 240 sealingly attaches to the main plate 232 at an upper open end 240a and is closed at the lower end 240b to contain the cathode gas. The insulation cap 252 is slightly oversized so that the TGC annulus 241 extends around the main plate 232 and down between the intermediate cylinder 240 and the outer cylinder 250.

The hot system exhaust gases flow down the TGC annulus 241 as shown by arrow "g" and advantageously exchange heat with the cathode air feed stream by virtue of the closeness between the cylinders 240, 250. Thus, an annular recuperator heat exchanger is formed by the stack end cap 221 and cylinders 240, 250 whereby heat from the hot exhaust gas is transferred to the cathode air feed stream. The second stage 282 of the two-stage tail gas combustor 260 is also formed between the cylinders 240, 250, e.g., downstream to act on cooler exhaust gas. In one embodiment, the second stage 282 is a wash coat on the inside of the outer cylinder 250. Exhaust from the second stage 282 of the tail gas combustor 260 passes downward further still as shown by arrow "h". Ultimately, the exhaust exits the SOFC system 200 by outlets 290 as shown by arrows "i".

In one embodiment, stack electrical power exits the hot zone through two wires that pass from the inlet tube sheet 102, through the annular service space 275 between the tubular portions 271, 273, through a hole in the main plate 232, and through a hole in the insulation cap 252. A CPOX igniter wire pair also passes through the insulation boundary to attach to a CPOX igniter, if needed. Wires for the tail gas combustor igniter also pass through the insulation boundary and into the tail gas combustor flame space 284. In an alternate embodiment, the feed tube 210 can be used as one of the power leads. As a result, the number of power leads that must penetrate the insulation and the associated heat losses are reduced.

As can be seen, mechanical support for the hot zone components can be achieved using support lugs that are part of the main plate 232, wherein such support lugs may pass through the insulation boundary. The main plate 232 can serve as a main mechanical support for any combination of the hot zone components including the insulation, the stack 100, the heat exchangers, the CPOX reactor 211 and combinations thereof.

The SOFC system 200 has particular advantages such as parts that serve multiple functions yet are simple. The main plate 232, for example, serves as a main mechanical support for the stack 100, a seal for the cathode and exhaust streams, and the main mechanical support for other hot zone components. The main plate 232 is also a simple, planar part that can be cut from stock thickness material with holes added for the various feed-throughs. No additional machined features are necessary. Thus, the main plate 232 can be made at low cost by high-volume manufacturing methods such as laser cutting, electro discharge machining, water jet cutting, stamping, punching, or machining.

The intermediate cylinder 240 serves as a heat exchanger and a containment vessel for the cathode air stream. The intermediate cylinder 240 can be made at low cost by high-volume manufacturing methods such as hydro forming, deep drawing, metal spinning, or seam welding of sheet stock. The end cap 221 also forms a heat exchanger with the intermediate cylinder 240 and can house the CPOX reactor 211. The outer cylinder 250 forms part of a heat exchanger, the two-stage tail gas combustor and the insulation boundary. Similarly, the outer cylinder 250 and the stack end cap 221 can also be made by hydro forming, deep drawing, metal spinning, or seam welding of sheet stock.

As can be seen from the discussion above, three sources of heat are present within the insulation boundary, e.g., the hot zone, defined by the outer shell 250 and insulation cap 252. The three heat sources are the CPOX reactor 211, the tail gas combustor 260, and the stack 100. At steady state, heat leaves the SOFC system 200 through the insulation and in the exhaust stream, which is above ambient temperature. Energy also leaves the SOFC system 200 through electrical power leads that carry stack electrical current. The balance of the heat dissipation and electrical energy leaving the SOFC system 200 determines the average temperature of the hot zone.

Figure 6:
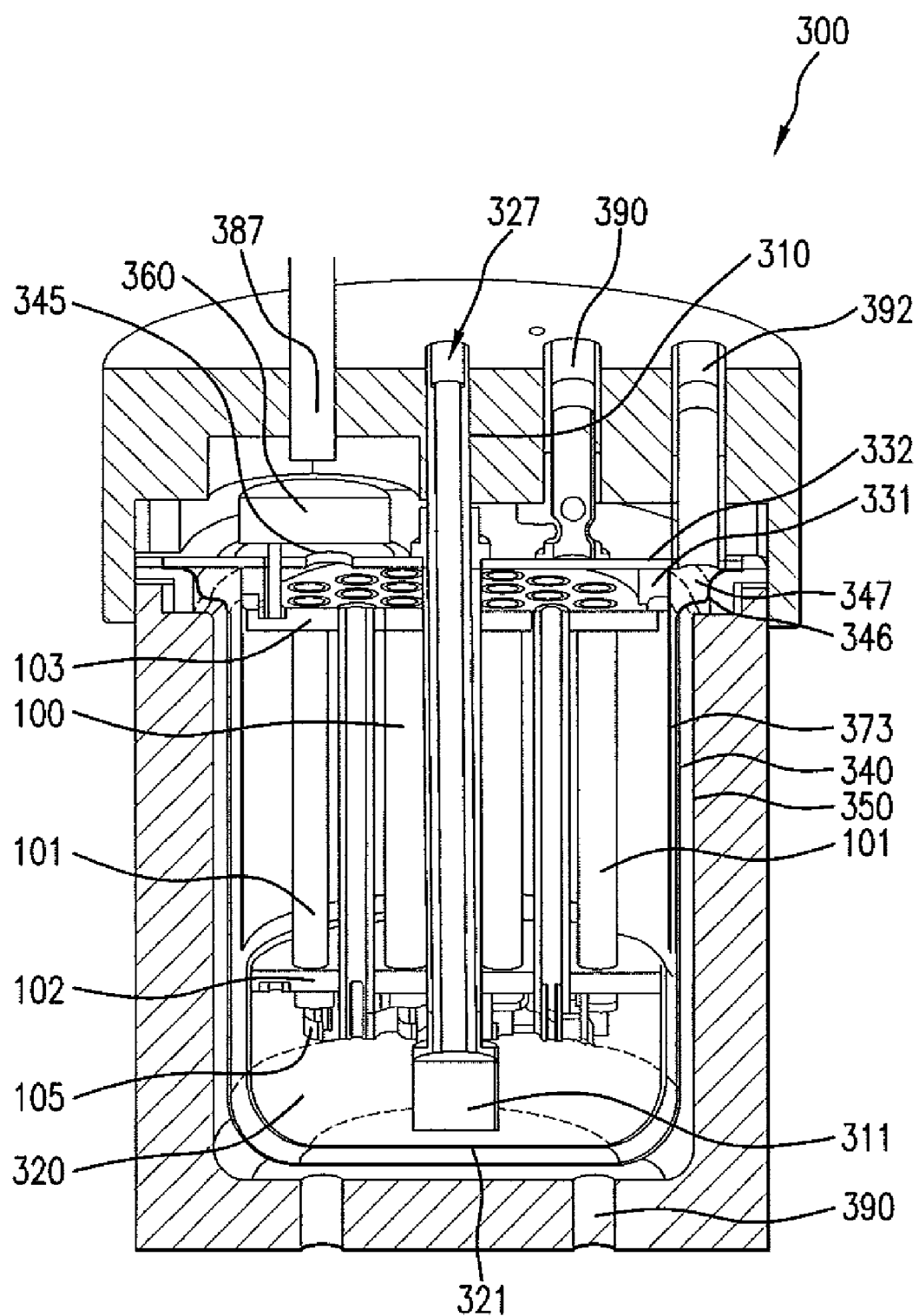
FIG. 6 is a cross-sectional view of another SOFC system with an improved, compact hot zone constructed in accordance with the subject technology.

Now referring to FIG. 6, a cross-sectional view of another SOFC system 300 constructed in accordance with the subject technology is shown. As will be appreciated by those of ordinary skill in the pertinent art, the SOFC system 300 utilizes similar principles to the SOFC system 200 described above. Accordingly, like reference numerals preceded by the numeral "3" instead of the numeral "2", are used to indicate like elements. An advantageous difference of the SOFC system 300 is the novel flow configuration and minimal, compact system size. The following discussion is directed mainly to the differences between the SOFC systems 200, 300.

The tube bundle 101 is similarly located inside concentric shells 340, 350 with a stack end cap 321 to form an anode feed plenum 320, an exhaust end plenum 331 and a cathode feed plenum 347. However, the partial shell 330 only has one tubular portion 373 depending from the main plate 332 to simplify and reduce the size of the SOFC system 300. An annular recuperator heat exchanger is again formed by the shells 330, 340, 350. The CPOX reactor 311 is outside the stack 100 but within the anode feed plenum 320. After the flow stream passes through the feed hole 345 of the main plate 332, the exhaust gases pass through a single-stage tail gas combustor 360 that is mounted on the main plate 332. The single-stage tail gas combustor 360 holds a porous catalyst material that facilitates combustion of unutilized fuel in the exhaust gases. The single-stage tail gas combustor 360 utilizes an igniter 387. The SOFC 300 also includes an inlet 390 for providing cooling air to control the stack temperature as needed. The SOFC 300 may also have one or more cathode air inlets 392 so cathode air flows down through the annular space into the bundle 101 through the annular slot just above the inlet end tube sheet 102. The annular slot being bounded by the inlet end tube sheet 102 and tubular portion 373.

The illustrated embodiments are understood as providing exemplary features of varying detail of certain embodiments, and therefore, features, components, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and can be altered without materially affecting or limiting the disclosed technology. Accordingly, while the invention has been described with respect to preferred embodiments, those skilled in the art will readily appreciate that various changes and/or modifications can be made to the invention without departing from the spirit or scope of the invention as defined by the appended claims.

INCORPORATION BY REFERENCE

All patents, published patent applications and other references disclosed herein are hereby expressly incorporated in their entireties by reference.

What is claimed is:

1. A solid oxide fuel cell system comprising:
   a stack including a bundle of tubular cells;
   a feed tube extending through the stack for providing an anode feed stream;
   an inlet end tube sheet for retaining a position of the tubular cells;
   a partial cylinder end cap sealed to the inlet end tube sheet to form an anode feed plenum having a reducing environment, wherein the anode feed plenum is in fluid communication with the feed tube so that the anode feed stream passes through the stack to become an anode exhaust;
   a main plate supporting the stack and forming an exhaust plenum into which the anode exhaust flows, the main plate defining at least one feed hole;
   an inner cylinder attached to the main plate and enclosing the stack and end cap to form a cathode feed plenum so that a cathode gas stream mixes with the anode exhaust in the exhaust plenum to form an exhaust flow; and
   a hot zone boundary element coupled to the main plate and having: i) a cap defining a flame space with the main plate; ii) a tail gas combustor at least partially located in the flame space, wherein the exhaust flow enters the tail gas combustor by the at least one feed hole and becomes a heated exhaust stream; and iii) an outer cylinder coupled to the cap and enclosing the inner cylinder to define an exhaust annular gap around the inner cylinder, wherein the heated exhaust stream exits through the exhaust annular gap and, in turn, exchanges heat with the cathode feed plenum.

2. A solid oxide fuel cell system as recited in claim 1, wherein the feed tube extends centrally through the stack and has a CPOX reactor therein so that flow from the CPOX reactor is directed into the anode feed plenum.

3. A solid oxide fuel cell system as recited in claim 1, wherein the tail gas combustor includes a first non-noble metal catalyst stage in the flame space and a second catalytic stage in the exhaust annular gap.

4. A solid oxide fuel cell system comprising:
   a main plate;
   a stack supported by and depending from the main plate, the stack having anodes and cathodes, wherein the main plate defines an exhaust plenum with the stack;
   a feed tube supported by the main plate and extending into the stack;
   an end cap coupled to the stack for defining an anode air stream plenum in fluid communication with the anodes;
   an inner cylinder supported by and sealingly attached to the main plate such that the inner cylinder at least partially surrounds the stack to define a cathode air stream plenum in fluid communication with the cathodes, wherein the exhaust plenum is in fluid communication with the anode air stream plenum and cathode air stream plenum;
   an insulation cap coupled to the main plate to define a flame space with the main plate;
   a CPOX reactor in the flame space; and
   an outer cylinder depending from the insulation cap and at least partially surrounding the inner cylinder to define an annular exhaust gap for exhaust gas from the exhaust plenum.

5. A solid oxide fuel cell system as recited in claim 4, wherein the inner cylinder includes a step adjacent the main plate to define a portion of the cathode air stream plenum.

6. A solid oxide fuel cell system as recited in claim 4, wherein the main plate is planar and substantially circular.

7. A solid oxide fuel cell system comprising:
a stack;
a feed tube extending through the stack for providing an anode feed stream;
a main plate secured to the stack and forming an exhaust plenum therewith, the main plate also defining at least one feed hole;
an inner cylinder coupled to the main plate and enclosing the stack to form a cathode feed plenum for a cathode air stream, and a cathode exhaust flow into the exhaust plenum;
a hot zone boundary element connected to the main plate and having: i) a cap defining a flame space with the main plate; ii) a first stage of a tail gas combustor located in the flame space, wherein the exhaust flow enters the flame space by the at least one feed hole and, in turn, passes through the first stage to become a first stage exhaust stream; iii) an outer cylinder coupled to the cap and enclosing the inner cylinder to define an annular exhaust gap around the inner cylinder, wherein the annular exhaust gap is in fluid communication with the flame space so that the first stage exhaust stream cools therein to provide heat to the cathode air stream; and iv) a second stage of the tail gas combustor located in the annular exhaust gap, wherein the cooled first stage exhaust stream passes through the second stage for further combustion before exiting.

8. A solid oxide fuel cell system having an improved hot zone comprising:
a stack fixed between an inlet end tube sheet and an outlet end tube sheet;
an end cap sealed to the inlet end tube sheet to form an anode feed plenum;
a main plate coupled to the outlet end tube sheet to form an exhaust plenum;
a feed tube supported by the main plate and extending centrally through the inlet end tube sheet and outlet end tube sheet, the feed tube having a CPOX reactor configured so that flow from the CPOX reactor is directed into the stack via the anode feed plenum and heat from the CPOX reactor radiates to the stack;
a partial cylinder depending from the main plate around a portion of the stack;
an intermediate cylinder having a closed end and an open end, the open end being attached to the main plate such that the intermediate cylinder defines an annular feed gap around the partial cylinder for containing a cathode air stream;
an insulation cap coupled to the main plate for forming a flame space in communication with the exhaust plenum; and
an outer cylinder having a closed end and an open end, the open end being coupled to the main plate such that the outer cylinder defines an exhaust annular gap around the intermediate cylinder for containing hot exhaust gases exiting the flame space, wherein heat is transferred from the hot exhaust gases to the cathode air stream.

9. A solid oxide fuel cell system as recited in claim 8, wherein the main plate supports the stack and forms a seal with the insulation cap.

10. A solid oxide fuel cell system as recited in claim 8, wherein the main plate forms a seal with the intermediate cylinder.

11. A solid oxide fuel cell system as recited in claim 8, further comprising a tail gas combustor fixed in the flame space to receive cathode and anode exhaust gases that pass through an exit hole defined in the main plate, wherein exhaust from the tail gas combustor is directed into the exhaust annular gap.

12. A solid oxide fuel cell system as recited in claim 11, wherein the tail gas combustor has a first stage in the flame space and a second stage in the exhaust annular gap.

13. A solid oxide fuel cell system comprising:
a stack having an anode feed plenum for receiving an anode feed stream;
a main plate supporting the stack and defining an exhaust plenum;
an inner cylinder having a closed end and an open end, the open end being attached to the main plate such that the inner cylinder defines a cathode feed plenum for containing a cathode air stream;
an outer cylinder having a closed end and an open end, the open end being attached to the main plate such that the outer cylinder defines an exhaust annular gap around the inner cylinder, the exhaust annular gap being in fluid communication with the exhaust plenum, wherein a heat exchanger is formed between the inner and outer cylinders; and
means in fluid communication with the stack for mixing the cathode air stream and anode air stream to create an exhaust gas, and directing the exhaust gas into the exhaust annular gap, wherein the means includes holes defined in the main plate, an inlet end tube sheet disposed in the inner cylinder and an outlet end tube sheet disposed in the inner cylinder, wherein the stack is fixed between the inlet end tube sheet and the outlet end tube sheet.

14. A solid oxide fuel cell system as recited in claim 13, further comprising:
an end cap sealed to the inlet end tube sheet to form the anode feed plenum; and
a feed tube extending centrally through the inlet end tube sheet and outlet end tube sheet, the feed tube having a CPOX reactor so that flow from the CPOX reactor is directed into the stack and heat from the CPOX reactor is delivered to the stack.

15. A solid oxide fuel cell system as recited in claim 14, wherein the CPOX reactor is in a location selected from the group consisting of outside the stack, well within the stack, and near an end of the stack.

16. A solid oxide fuel cell system as recited in claim 13, wherein the stack has tubular cells, each cell having an anode located at an inside surface and a cathode located on an outside surface.

17. A solid oxide fuel cell system as recited in claim 13, further comprising an open-ended two-layer shell depending from the main plate, the two-layer shell having a feed tube extending into the stack, and inner and outer tubular portions such that a service space is created between the inner and outer tubular portions, wherein the outer tubular portion nestles closely within the inner cylinder and, as a result, a heat exchanger with high heat transfer is formed there between.

18. A solid oxide fuel cell system as recited in claim 17, wherein the feed tube acts as a power lead for an electrical device.

19. A solid oxide fuel cell system as recited in claim 1, further comprising:

a recuperator, wherein the tail gas combustor includes a first combustion stage and a second catalytic stage, and wherein the recuperator operates between the first combustion stage and the second catalytic stage for transferring heat from the exhaust gas before the exhaust gas enters the second catalytic stage.

20. A solid oxide fuel cell system as recited in claim 19, wherein the heat is transferred to a cathode air feed stream, the first combustion stage includes an igniter, and the solid oxide fuel cell system is portable.

21. A solid oxide fuel cell system as recited in claim 19, further comprising:
   a feed tube supported by the main plate and extending centrally through the stack, the feed tube having a CPOX reactor configured so that flow from the CPOX reactor is directed into the stack via the anode feed plenum and heat from the CPOX reactor radiates to the stack.

22. A solid oxide fuel cell system as recited in claim 1, wherein the tail gas combustor comprises:
   a combustion stage for receiving a mixture of anode and cathode exhaust gas to create a combustion stage exhaust; and
   a catalytic stage are arranged such that the combustion stage exhaust cools before entering the catalytic stage to prevent vaporizing a noble metal in the catalytic stage.

23. A solid oxide fuel cell system as recited in claim 22, wherein the tail gas combustor further comprises:
   a recuperator for cooling the combustion stage exhaust by transferring heat to a cathode air feed stream.

* * * * *